(12) United States Patent
Takikawa et al.

(10) Patent No.: US 8,932,142 B2
(45) Date of Patent: Jan. 13, 2015

(54) DAMPER DEVICE

(75) Inventors: Yoshihiro Takikawa, Tsushima (JP); Yoichi Oi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/367,641

(22) Filed: Feb. 7, 2012

(65) Prior Publication Data
US 2012/0208646 A1 Aug. 16, 2012

(30) Foreign Application Priority Data
Feb. 15, 2011 (JP) ................... 2011-029714

(51) Int. Cl.
*F16F 15/121* (2006.01)
*F16D 3/66* (2006.01)
*F16H 45/02* (2006.01)
*F16F 15/123* (2006.01)

(52) U.S. Cl.
CPC *F16D 3/66* (2013.01); *F16H 45/02* (2013.01); *F16F 15/12353* (2013.01); *F16F 15/12346* (2013.01); *F16H 2045/0205* (2013.01); *F16H 2045/0231* (2013.01); *F16H 2045/0294* (2013.01)
USPC ........ 464/64.1; 464/67.1; 464/68.8; 464/68.9

(58) Field of Classification Search
USPC ............. 464/67.1, 68.7, 68.8, 68.9; 192/3.29, 192/213.2
See application file for complete search history.

(56) References Cited

U.S. PATENT DOCUMENTS

| | | | |
|---|---|---|---|
| 4,347,717 A * | 9/1982 | Lamarche ............... | 192/213.2 X |
| 4,422,535 A * | 12/1983 | Ling ...................... | 192/213.2 X |
| 4,693,348 A * | 9/1987 | Tsukamoto et al. ......... | 192/3.29 |
| 4,702,721 A | 10/1987 | Lamarche | |
| 4,987,980 A * | 1/1991 | Fujimoto ............... | 192/213.2 X |
| 5,080,215 A * | 1/1992 | Forster et al. ................ | 192/3.29 |
| 5,149,303 A | 9/1992 | Koshimo | |
| 5,246,399 A * | 9/1993 | Yanko et al. .................. | 464/67.1 |
| 5,772,515 A | 6/1998 | Yamakawa et al. | |

(Continued)

FOREIGN PATENT DOCUMENTS

| DE | 10 2007 057431 A1 | 6/2009 |
|---|---|---|
| EP | 2 642 162 A1 | 9/2013 |

(Continued)

OTHER PUBLICATIONS

May 15, 2012 International Search Report issued in International Patent Application No. PCT/JP2012/052786 (with translation).

(Continued)

*Primary Examiner* — Gregory Binda
*Assistant Examiner* — Matthieu Setliff
(74) *Attorney, Agent, or Firm* — Oliff PLC

(57) ABSTRACT

A damper device including an input element to which power from a motor is transmitted; a first elastic body to which power is transmitted from the input element; a first intermediate element to which power is transmitted from the first elastic body; a second elastic body to which power is transmitted from the first intermediate element; a second intermediate element to which power is transmitted from the second elastic body; a third elastic body to which power is transmitted from the second intermediate element; and an output element to which power is transmitted from the third elastic body. The first and second elastic bodies are coil springs, and the third elastic body is an arc spring that is arranged radially inward of the first and second elastic bodies.

18 Claims, 4 Drawing Sheets

(56) References Cited

U.S. PATENT DOCUMENTS

| | | | |
|---|---|---|---|
| 5,868,228 | A | 2/1999 | Fukushima |
| 5,885,160 | A | 3/1999 | Tauvron |
| 6,051,901 | A | 4/2000 | Ishida |
| 6,209,701 | B1 | 4/2001 | Hashimoto et al. |
| 6,257,383 | B1 | 7/2001 | Ohkubo et al. |
| 6,306,043 | B1 | 10/2001 | Annic et al. |
| 7,207,888 | B2 | 4/2007 | Verhoog et al. |
| 8,047,921 | B2 | 11/2011 | Kombowski |
| 8,313,385 | B2 | 11/2012 | Mundt et al. |
| 2003/0032487 | A1 | 2/2003 | Verhoog et al. |
| 2003/0100376 | A1* | 5/2003 | Friedmann et al. |
| 2009/0139819 | A1* | 6/2009 | Jameson et al. ............ 192/3.29 |
| 2009/0152066 | A1 | 6/2009 | Degler et al. |
| 2009/0183962 | A1 | 7/2009 | Nakamura |
| 2010/0133063 | A1 | 6/2010 | Degler |
| 2011/0240432 | A1 | 10/2011 | Takikawa et al. |
| 2012/0048057 | A1* | 3/2012 | Fafet et al. |
| 2012/0088589 | A1* | 4/2012 | Verhoog ..................... 464/67.1 |
| 2012/0208646 | A1 | 8/2012 | Takikawa et al. |
| 2012/0208647 | A1 | 8/2012 | Takikawa et al. |
| 2012/0208648 | A1 | 8/2012 | Takikawa et al. |
| 2012/0252586 | A1 | 10/2012 | Takikawa et al. |

FOREIGN PATENT DOCUMENTS

| | | |
|---|---|---|
| FR | 2 735 548 A1 | 12/1996 |
| JP | A-2-008533 | 1/1990 |
| JP | A-4-266651 | 9/1992 |
| JP | A-9-250622 | 9/1997 |
| JP | A-H10-047453 | 2/1998 |
| JP | A-H10-169715 | 6/1998 |
| JP | A-2001-082577 | 3/2001 |
| JP | A-2001-116111 | 4/2001 |
| JP | A-2006-009817 | 1/2006 |
| JP | A-2006-29553 | 2/2006 |
| JP | A-2007-113661 | 5/2007 |
| JP | A-2007-155132 | 6/2007 |
| JP | A-2008-208855 | 9/2008 |
| JP | A-2009-168226 | 7/2009 |
| JP | A-2010-038312 | 2/2010 |
| WO | WO2010/079273 A1 * | 7/2010 |
| WO | WO 2010/146280 A1 | 12/2010 |

OTHER PUBLICATIONS

Mar. 26, 2013 Office Action issued in U.S. Appl. No. 13/368,923.
Jul. 15, 2013 Office Action issued in U.S. Appl. No. 13/368,923.
Apr. 24, 2012 International Search Report issued in PCT/JP2012/057446 (with translation).
U.S. Appl. No. 13/368,923, filed Feb. 8, 2012.
U.S. Appl. No. 13/431,421, filed Mar. 27, 2012.
Nov. 4, 2013 Supplementary European Search Report issued in European Patent Application No. 12746548.2.
Jan. 10, 2014 Office Action issued in U.S. Appl. No. 13/431,421.
Aug. 6, 2013 Office Action issued in U.S. Appl. No. 13/431,421.
Sep. 30, 2013 Notice of Allowance issued in U.S. Appl. No. 13/368,923.
Jan. 17, 2014 Notice of Allowance issued in U.S. Appl. No. 13/368,923.
Sep. 2, 2014 Notice of Allowance issued in U.S. Appl. No. 13/368,923.
May 14, 2014 Office Action issued in U.S. Appl. No. 13/368,923.
Feb. 7, 2014 Supplementary European Search Report issued in European Patent Application No. 12746587.0.

* cited by examiner

F I G . 2
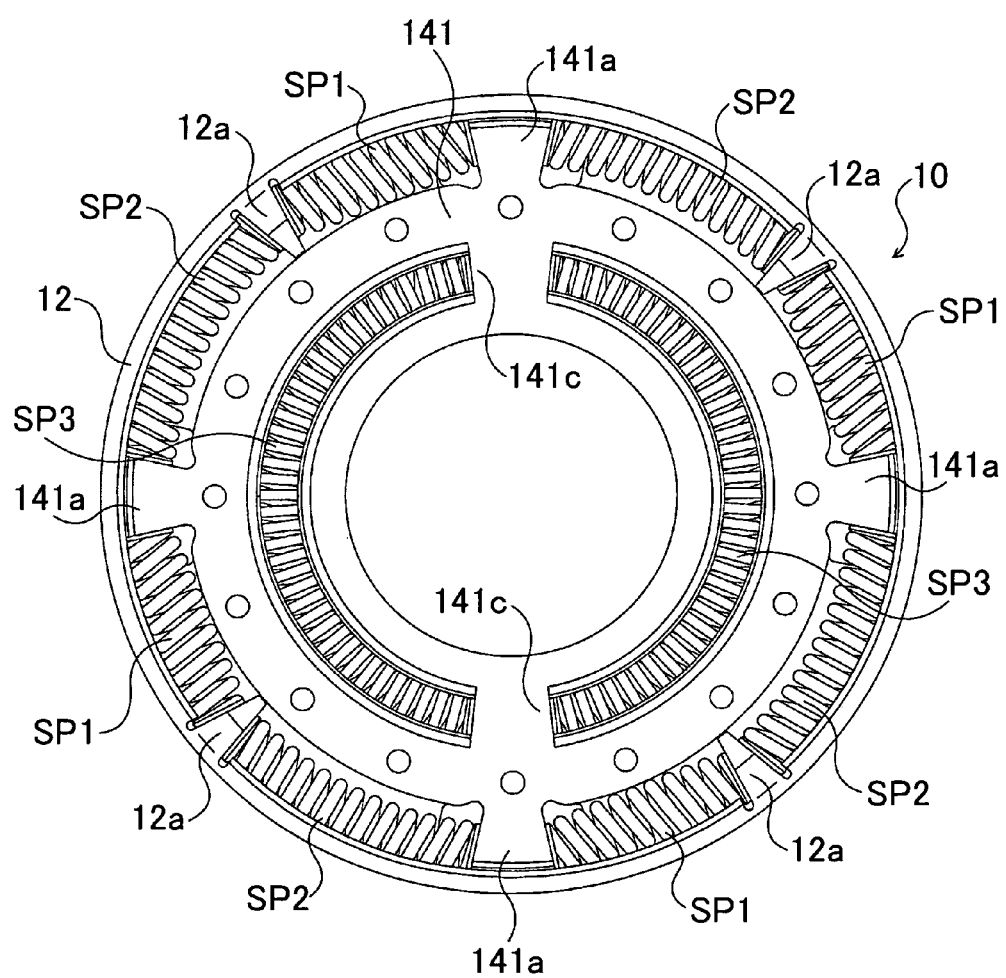

DAMPER DEVICE

INCORPORATION BY REFERENCE

The disclosure of Japanese Patent Application No. 2011-029714 filed on Feb. 15, 2011 including the specification, drawings and abstract is incorporated herein by reference in its entirety.

BACKGROUND OF THE INVENTION

The present invention relates to a damper device that includes an input element to which power is transmitted from a motor, a first intermediate element to which power is transmitted from the input element via a first elastic body, a second intermediate element to which power is transmitted from the first intermediate element via a second elastic body, and an output element to which power is transmitted from the second intermediate element via a third elastic body.

DESCRIPTION OF THE RELATED ART

There is known an existing damper device of this type, which includes first elastic members that are provided on a piston of a lock-up device, second elastic members that are provided on a driven plate fixed to a turbine runner of a torque converter, and an intermediate member that is coupled to the piston in a rotation direction via the first elastic members and that is coupled to the driven plate in the rotation direction via the second elastic members (for example, see Japanese Patent Application Publication No. 2001-82577). In this damper device, the second elastic members each are formed of a pair of coil springs and an intermediate float body that is arranged between the pair of coil springs, and each pair of coil springs are caused to act in series with each other to thereby increase the torsional angle (provide long stroke).

SUMMARY OF THE INVENTION

In the existing damper device described above, the second elastic members each are formed of a pair of coil springs and an intermediate float body that is arranged between the pair of coil springs to thereby provide long stroke; however, part of the elastic members that constitute the damper device are formed of an arc spring to thereby make it possible to provide further long stroke (low stiffness) for the damper device. However, an arc spring has a hysteresis higher than that of a coil spring, so, when an arc spring is applied to the damper device, it is necessary to make consideration so as not to impair the vibration damping effect of the arc spring because of the hysteresis.

Thus, it is a main object of the present invention to improve the vibration damping characteristic while providing long stroke for the damper device using an arc spring.

The damper device according to the present invention employs the following means for achieving the above main object.

A damper device according to an aspect of the present invention includes: an input element to which power from a motor is transmitted; a first elastic body to which power is transmitted from the input element; a first intermediate element to which power is transmitted from the first elastic body; a second elastic body to which power is transmitted from the first intermediate element; a second intermediate element to which power is transmitted from the second elastic body; a third elastic body to which power is transmitted from the second intermediate element; and an output element to which power is transmitted from the third elastic body. In the damper device, the first and second elastic bodies are coil springs and the third elastic body is an arc spring that is arranged radially inward of the first and second elastic bodies.

The damper device includes the input element to which power is transmitted from the motor, the first intermediate element to which power is transmitted from the input element via the first elastic body, the second intermediate element to which power is transmitted from the first intermediate element via the second elastic body, and the output element to which power is transmitted from the second intermediate element via the third elastic body. Then, in this damper device, coil springs are used as the first and second elastic bodies, and an arc spring that is arranged radially inward of the first and second elastic bodies is used as the third elastic body. In this way, the third elastic body, which is one of the serially arranged elastic bodies, is an arc spring, so it is possible to provide long stroke (low stiffness) for the damper device. In addition, the third elastic body that is an arc spring is arranged radially inward of the first and second elastic bodies to reduce centrifugal force that acts on the third elastic body to thereby reduce the hysteresis of the third elastic body, that is, friction force that acts on the third elastic body during a reduced load. By so doing, it is possible to appropriately maintain the vibration damping characteristic of the third elastic body. Thus, in this damper device, it is possible to improve the vibration damping characteristic while providing long stroke using an arc spring.

In addition, the input element may have a contact portion that contacts with one end of the first elastic body, the first intermediate element may have a contact portion that is arranged between the other end of the first elastic body and one end of the second elastic body adjacent to the first elastic body and that contacts with both, the second intermediate element may have a contact portion that slidably supports the third elastic body and that contacts with the other end of the second elastic body and a contact portion that contacts with one end of the third elastic body, and the output element may have a contact portion that contacts with the other end of the third elastic body.

Furthermore, a stiffness of the first elastic body may be higher than stiffnesses of the second and third elastic bodies. That is, in the above damper device, the first intermediate element and the second intermediate element are arranged between the first elastic body and the third elastic body, so the first intermediate element and the second intermediate element may resonate. In contrast to this, when the stiffness of the first elastic body is set so as to be higher than the stiffness of the second elastic body, this makes it easy to substantially integrate the first intermediate element with the second intermediate element, and the resonance frequency of the first intermediate element and second intermediate element is increased by setting the stiffness of the first elastic body so as to be relatively high, so it is possible to cause resonance between the first intermediate element and the second intermediate element when the rotation speed of the input element is relatively high, that is, when the rotation speed of the motor is relatively high, and torque (vibrating force) from the motor is relatively low. By so doing, it is possible to suppress an increase in the vibration level of the damper device as a whole due to resonance between the first intermediate element and the second intermediate element. Then, when the stiffness of the first elastic body is set so as to be higher than the stiffness of the third elastic body, the characteristic of the arc spring that is the third elastic body is utilized to improve the vibration damping characteristic while providing the long stroke (low stiffness) for the damper device, and it is possible to appropriately damp resonance between the first intermediate element and the second intermediate element by the third elastic body.

In addition, the input element may be connected via a lock-up clutch to an input member coupled to the motor, and the output element may be coupled to an input shaft of a transmission. That is, the above damper device is able to improve the vibration damping characteristic while providing long stroke (low stiffness) using an arc spring. Thus, by using the above damper device, when the rotation speed of the motor is extremely low, it is possible to carry out lockup by the lock-up clutch, that is, couple the input member to the input shaft of the transmission, while appropriately reducing transmission of vibrations from the input member to the input shaft of the transmission.

BRIEF DESCRIPTION OF THE DRAWINGS

FIG. 2 is a configuration diagram that shows the damper device 10;

DETAILED DESCRIPTION OF THE EMBODIMENTS

A mode for carrying out the present invention will now be described using an embodiment.

Figure 1:
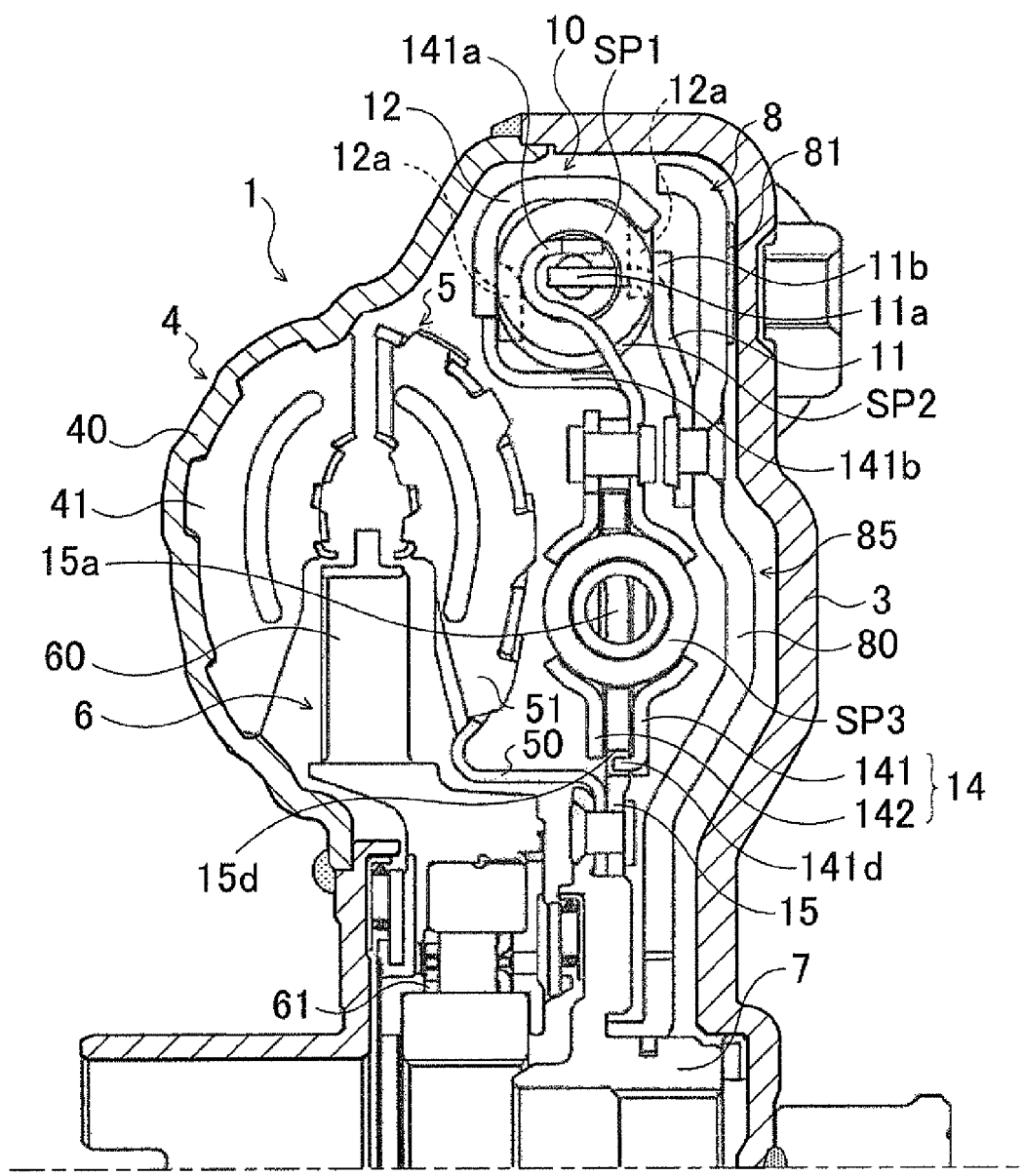
FIG. 1 is a partially cross-sectional view that shows a fluid transmission apparatus 1 that includes a damper device 10 according to an embodiment of the present invention.

FIG. 1 is a configuration diagram that shows a fluid transmission apparatus 1 that includes a damper device 10 according to the embodiment of the present invention. The fluid transmission apparatus 1 shown in the drawing is a torque converter that is mounted as a starting apparatus on a vehicle equipped with an engine (internal combustion engine) that serves as a motor. The fluid transmission apparatus 1 includes: a front cover (input member) 3 that is coupled to a crankshaft of the engine (not shown); a pump impeller (input-side fluid transmitting element) 4 that is fixed to the front cover 3; a turbine runner (output-side fluid transmitting element) 5 that is rotatable coaxially with the pump impeller 4; a stator 6 that rectifies the flow of hydraulic oil (hydraulic fluid) from the turbine runner 5 to the pump impeller 4; a damper hub (output member) 7 that is fixed to an input shaft of a transmission (not shown), which is an automatic transmission (AT) or a continuously variable transmission (CVT); a friction-type single disc lock-up clutch mechanism 8 that has a lock-up piston 80; and the damper device 10 that is connected to the damper hub 7 and that is connected to the lock-up piston 80.

The pump impeller 4 has a pump shell 40 that is airtightly fixed to the front cover 3 and a plurality of pump blades 41 that are arranged on the inner surface of the pump shell 40. The turbine runner 5 has a turbine shell 50 and a plurality of turbine blades 51 that are arranged on the inner surface of the turbine shell 50. The turbine shell 50 is fitted to the damper hub 7, and is fixed to the damper hub 7 via rivets. The stator 6 has a plurality of stator blades 60. The rotation direction of the stator 6 is set in only one direction by a one-way clutch 61. The pump impeller 4 and the turbine runner 5 face each other, and these pump impeller 4, turbine runner 5 and stator 6 form a torus (annular flow passage) that circulates hydraulic oil.

As shown in FIG. 1 and FIG. 2, the damper device 10 includes: a drive member 11 that serves as an input element; a first intermediate member (first intermediate element) 12 that engages with the drive member 11 via a plurality of first springs (first elastic bodies) SP1; a second intermediate member (second intermediate element) 14 that engages with the first intermediate member 12 via a plurality of second springs (second elastic bodies) SP2; and a driven member (output element) 15 that engages with the second intermediate member 14 via a plurality of third springs (third elastic bodies) SP3. In the embodiment, the first and second springs SP1 and SP2 each are a coil spring made of a metal material wound in a spiral shape so as to have an axis extending in a straight line when no load is applied, and the third springs SP3 each are an arc spring made of a metal material wound so as to have an axis extending in a circular arc shape when no load is applied.

The drive member 11 has a plurality of spring contact portions 11a, which are respectively in contact with one ends of the corresponding first springs SP1, and a plurality of spring support portions 11b. Then, the drive member 11 is fixed to the lock-up piston 80 of the lock-up clutch mechanism 8 via rivets, and is arranged in the outer peripheral region of a housing inner space defined by the front cover 3 and the pump shell 40 of the pump impeller 4. The first intermediate member 12 is formed as an annular member that is able to slidably support the first and second springs SP1 and SP2 together with the plurality of spring support portions 11b of the drive member 11. In the embodiment, the first intermediate member 12 is rotatably supported around the axis of the fluid transmission apparatus 1 by the second intermediate member 14 and is arranged in the outer peripheral region of the housing inner space. In addition, as shown in FIG. 1 and FIG. 2, the first intermediate member 12 has a plurality of spring contact portions 12a that are respectively arranged between the other ends of the corresponding first springs SP1 and one ends of the second springs SP2 adjacent to the first springs SP1 and that are respectively in contact with both.

The second intermediate member 14 is formed of an annular first plate 141 and an annular second plate 142 that is fixed to the first plate 141 via rivets. In the embodiment, the second intermediate member 14 is rotatably supported around the axis of the fluid transmission apparatus 1 by the driven member 15. The first plate 141 of the second intermediate member 14 has, at its outer peripheral side, a plurality of spring contact portions 141a that are respectively in contact with the other ends of the corresponding second springs SP2 and a plurality of support portions 141b that rotatably support the inner peripheral portion of the first intermediate member 12, and has, at its inner peripheral side, a plurality of spring support portions for supporting the third springs SP3. In addition, the second plate 142 of the second intermediate member 14 has spring support portions that respectively face the spring support portions of the first plate 141 to support the third springs SP3. Then, a plurality of spring contact portions 141c (see FIG. 2) that are respectively in contact with one ends of the corresponding third springs SP3 are formed in the first and second plates 141 and 142.

By so doing, the plurality of first springs SP1 are arranged at the outer peripheral portion of the damper device 10 so as to be respectively positioned between the spring contact portions 11a of the drive member 11 and the spring contact portions 12a of the first intermediate member 12, and the plurality of second springs SP2 are arranged at the outer peripheral portion of the damper device 10 so as to be respectively positioned between the spring contact portions 12a of the first intermediate member 12 and the second intermediate member 14, that is, the spring contact portions 141a of the first plate 141. In addition, the plurality of third springs SP3 each are arranged so as to be spaced apart from the first and second springs SP1 and SP2 in the radial direction of the fluid transmission apparatus 1, and are positioned radially inward of the first and second springs SP1 and SP2.

The driven member 15 is arranged between the first plate 141 and second plate 142 of the second intermediate member 14, and is fixed to the damper hub 7. In addition, the driven member 15 has a plurality of spring contact portions 15a that are respectively in contact with the other ends of the corresponding third springs SP3. Furthermore, the driven member 15 has a plurality of circular arc slits 15d that are engaged with protrusions 141d extending from the inner peripheral portion of the first plate 141 of the second intermediate member 14 in the axial direction of the fluid transmission apparatus 1. When the protrusions 141d of the first plate 141 are engaged with (loosely fitted to) the corresponding slits 15d of the driven member 15, the second intermediate member 14 is supported by the driven member 15 and arranged around the axis of the fluid transmission apparatus 1 so as to be rotatable with respect to the driven member 15 within the range corresponding to the perimeter of each slit 15d.

The lock-up clutch mechanism 8 is able to carry out lockup for coupling the front cover 3 to the damper hub 7 via the damper device 10 and to release the lockup. In the embodiment, as shown in FIG. 1, the lock-up piston 80 of the lock-up clutch mechanism 8 is arranged inside the front cover 3 and near the inner wall surface, adjacent to the engine (right side in the drawing), of the front cover 3, and is fitted to the damper hub 7 so as to be slidable in the axial direction and rotatable with respect to the damper hub 7. In addition, a friction material 81 is stuck to the outer periphery of the surface on the front cover 3 side of the lock-up piston 80. Then, a lock-up chamber 85 that is connected to a hydraulic control unit (not shown) via an oil passage fanned in a hydraulic oil supply hole (not shown) and the input shaft is defined between the back surface (right side surface in the drawing) of the lock-up piston 80 and the front cover 3.

Figure 3:
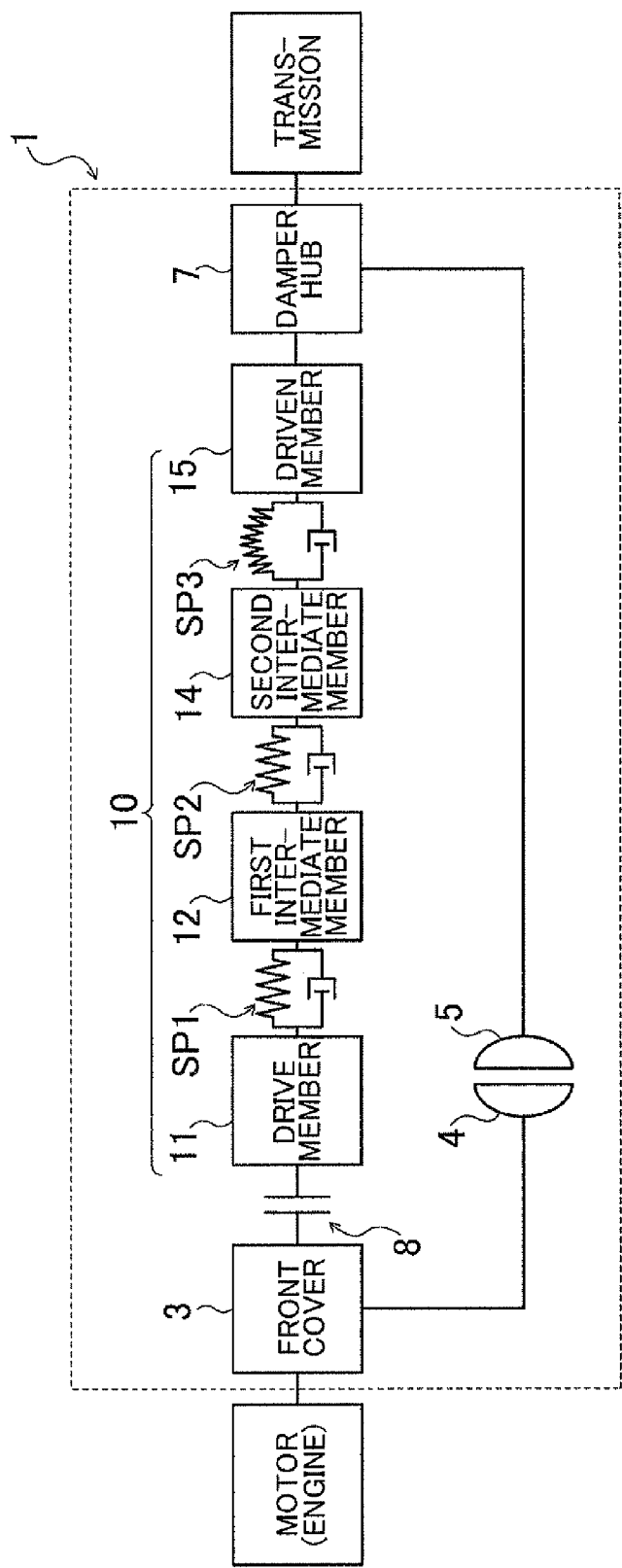
FIG. 3 is a schematic configuration diagram of the fluid transmission apparatus 1.

When power is transmitted between the pump impeller 4 and the turbine runner 5 without carrying out lockup of the lock-up clutch mechanism 8, hydraulic oil supplied to the pump impeller 4 and the turbine runner 5 flows into the lock-up chamber 85, and the lock-up chamber 85 is filled with hydraulic oil. Thus, at this time, the lock-up piston 80 is not moved toward the front cover 3, so the lock-up piston 80 is not frictionally engaged with the front cover 3. Then, during lock-up release where lockup is not carried out by the lock-up clutch mechanism 8 in this way, as is apparent from FIG. 3, power from the engine that serves as a motor is transmitted to the input shaft of the transmission via a path formed of the front cover 3, the pump impeller 4, the turbine runner 5 and the damper hub 7.

In addition, when the pressure inside the lock-up chamber 85 is reduced by the hydraulic control unit (not shown), the lock-up piston 80 is moved toward the front cover 3 because of the pressure difference and is then frictionally engaged with the front cover 3. By so doing, the front cover 3 is coupled to the damper hub 7 via the damper device 10. During lockup where the front cover 3 is coupled to the damper hub 7 by the lock-up clutch mechanism 8 in this way, power from the engine that serves as a motor is transmitted to the input shaft of the transmission via a path formed of the front cover 3, the lock-up clutch mechanism 8, the drive member 11, the first springs SP1, the first intermediate member 12, the second springs SP2, the second intermediate member 14, the third springs SP3, the driven member 15 and the damper hub 7, as is apparent from FIG. 3. At this time, fluctuations (vibrations) in torque input to the front cover 3 are absorbed by the first, second and third springs SP1, SP2 and SP3 of the damper device 10.

Then, in the fluid transmission apparatus 1 of the embodiment, lockup is carried out by the lock-up clutch mechanism 8 at the time when the rotation speed of the engine coupled to the front cover 3 has reached an extremely low lock-up rotation speed Nlup, that is, for example, about 1000 rpm. By so doing, power transmission efficiency between the engine and the transmission is improved to thereby make it possible to further improve the fuel economy of the engine. Note that, when reducing the pressure inside the lock-up chamber 85 is stopped, the lock-up piston 80 separates from the front cover 3 because of a reduction in pressure difference resulting from the flow of hydraulic oil into the lock-up chamber 85. By so doing, lockup is released.

In this way, in order to carry out lockup at the time when the rotation speed of the engine has reached the extremely low lock-up rotation speed Nlup, that is, for example, about 1000 rpm, it is necessary to appropriately damp vibrations by the damper device 10 between the engine and the transmission when the rotation speed of the engine falls within a low rotation speed range near the above described lock-up rotation speed Nlup. Therefore, in the damper device 10 of the embodiment, in order to improve the vibration damping characteristic, arc springs are used as the third springs SP3 among the serially arranged first to third springs SP1 to SP3 to provide further long stroke (low stiffness). However, each arc spring has a hysteresis higher than that of each coil spring, so, in the damper device 10 of the embodiment, the thin springs SP3, which are arc springs, are arranged radially inward of the first and second springs SP1 and SP2 such that the hysteresis does not impair the vibration damping effect of the third springs SP3 that are arc springs. By so doing, centrifugal force that acts on the third springs SP3 is reduced to reduce the hysteresis of the third springs SP3, that is, friction force that acts on the third springs SP3 during a reduced load to thereby make it possible to appropriately maintain the vibration damping characteristic of the third springs SP3.

On the other hand, in the fluid transmission apparatus 1 of the embodiment, the first and second intermediate members 12 and 14, which serve as the intermediate elements, are arranged between the first springs SP1 and third springs SP3 of the damper device 10, so the first intermediate member 12 and the second intermediate member 14 may resonate. Then, resonance between the first intermediate member 12 and the second intermediate member 14 occurs when the rotation speed of the engine, for example, falls within a low rotation speed range near the above described lock-up rotation speed Nlup and the vibration level of the damper device 10 as a whole (driven member 15 serving as the output element) is relatively high, the vibration level of the damper device 10 as a whole further increases because of the resonance between the first intermediate member 12 and the second intermediate member 14, and relatively large vibrations may be transmitted to the downstream side of the damper device 10, that is, the input shaft of the transmission. Thus, in order to smoothly carry out lockup by the lock-up clutch mechanism 8 at the time when the rotation speed of the engine has reached the extremely low lock-up rotation speed Nlup, it is better to cause resonance between the first intermediate member 12 and the second intermediate member 14 when the rotation speed of the engine after completion of lockup is relatively high and torque, that is, vibrating force, from the engine is relatively low.

Here, the state where the first and second intermediate members 12 and 14 substantially integrally resonate corresponds to a state where the first springs SP1 and the third springs SP3 are connected in parallel with the first and second intermediate members 12 and 14, which serve as a single mass. In this case, when the spring constant of each first spring SP1 is "k1" and the spring constant of each third spring SP3 is "k3", the resultant spring constant $k_{13}$ of the system is "k1+k3", so the resonance frequency (natural frequency) fi of the first and second intermediate members 12 and 14 that substantially integrally resonate is expressed as fi=½π·√{(k1+k3)/I} (where "I" is the sum of the inertia of the first intermediate member 12, the inertia of the second intermediate member 14 and the inertia of the second springs SP2. Note that the unit of the inertia I is "kg·m2"). In addition, when the damper device 10 as a whole integrally resonates, the drive member 11, the first springs SP1, the first intermediate member 12, the second springs SP2, the second intermediate member 14, the third springs SP3 and the driven member 15 are coupled in series with one another, so the resultant spring constant $k_{123}$ of the system is expressed by $1/k_{123}$=1/k1+1/k2+1/k3 where the spring constant of each second spring SP2 is "k2", and the resonance frequency ft of the damper device 10 as a whole is expressed by ft=½π·√($k_{123}$/It) (where "It" is the inertia of the damper device as a whole).

Thus, in order to cause resonance between the first intermediate member 12 and the second intermediate member 14 when the rotation speed of the engine after completion of lockup is relatively high, it is better to increase the sum of the spring constant k1 of each first spring SP1 and the spring constant k3 of each third spring SP3 as much as possible so as to further increase the resonance frequency fi of the first and second intermediate members 12 and 14. In addition, in order to cause the resonance of the damper device 10 as a whole at the time when the rotation speed of the engine before completion of lockup is relatively low, it is better to reduce the resultant spring constant $k_{123}$ of the system as much as possible so as to further decrease the resonance frequency ft of the damper device 10 as a whole.

In consideration of the above, in the damper device 10 of the embodiment, the stiffness of each first spring SP1 is set so as to be higher than the stiffness of each second spring SP2 and the stiffness of each third spring SP3. That is, in the present embodiment, the spring constant k1 of each first spring SP1 is set so as to be much larger (for example, about several times) than the spring constant k2 of each second spring SP2 and the spring constant k3 of each third spring SP3. When the stiffness of each first spring SP1 is set so as to be higher than the stiffness of each second spring SP2 in this way, this makes it easy to substantially integrate the first intermediate member 12 with the second intermediate member 14, and the resonance frequency fi of the first and second intermediate members 12 and 14 is increased by setting the stiffness of each first spring SP1 so as to be relatively high, so it is possible to cause resonance between the first intermediate member 12 and the second intermediate member 14 when the rotation speed of the engine is relatively high and torque (vibrating force) from the engine is relatively low. Furthermore, when the stiffness of each first spring SP1 is set so as to be higher than the stiffness of each third spring SP3, the characteristic of the arc springs that are the third springs SP3 is utilized to improve the vibration damping characteristic while providing the long stroke (low stiffness) for the damper device 10, and it is possible to appropriately damp resonance between the first intermediate member 12 and the second intermediate member 14 by the third springs SP3. Then, in the damper device 10 of the embodiment, in order to utilize the characteristic of an arc spring such that the stiffness may be easily decreased as compared with a coil spring and to further appropriately maintain the vibration damping characteristic of the third springs SP3, which are arc springs, arranged radially inward of the first and second springs SP1 and SP2 so as to reduce hysteresis, the spring constant k3 (stiffness) of each third spring SP3 is set so as to be smaller than the spring constant k2 (stiffness) of each second spring SP2. That is, by setting the spring constants (stiffnesses) of the first to third springs SP1 to SP3 such that k1>k2>k3 (k1>>k2>k3), the resonance frequency fi of the first and second intermediate members 12 and 14 is increased while the resonance frequency ft of the damper device 10 as a whole is decreased, and the stiffness of each third spring SP3 is decreased to thereby make it possible to improve the vibration damping characteristic of the damper device 10 as a whole.

Note that, here, the "stiffness" and the "spring constant" each indicate "force (torque)/torsional angle (the unit is "Nm/rad" or "Nm/deg")", and are synonymous with each other. In addition, the stiffness (spring constant) of a spring decreases (reduces) by reducing the wire diameter of the spring or reducing the number of turns per unit length, and increases by increasing the wire diameter of the spring or increasing the number of turns per unit length.

Figure 4:
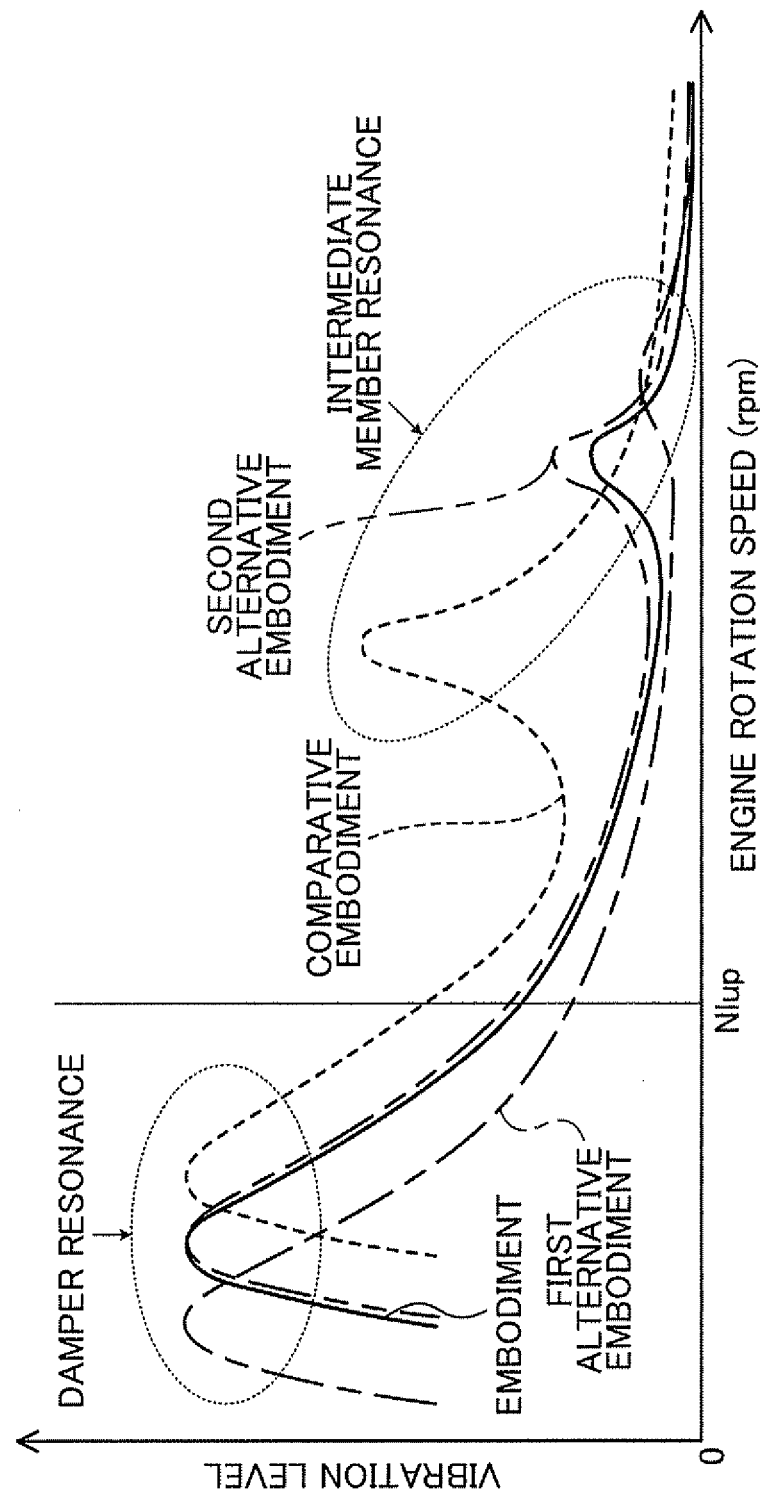
FIG. 4 is an explanatory graph that illustrates the correlation between the rotation speed of an engine, which serves as a motor, and the vibration level of the damper device 10.

FIG. 4 is an explanatory graph that illustrates the correlation between the rotation speed of the engine and the vibration level of the above described damper device 10. The graph illustrates the correlation between the rotation speed of the engine (front cover 3) and the vibration level in the driven member 15 (damper hub 7), which serves as the output element of the damper device, in a plurality of damper devices, including the damper device 10 of the embodiment, obtained through simulations of a torsional vibration system. In the above simulations, the specifications of the damper device 10, other than the specifications of the engine that serves as a motor, the specifications of the pump impeller 4, turbine runner 5 and lock-up clutch mechanism 8 and the specifications of the first to third springs SP1 to SP3, are basically the same, and the types and stiffnesses of the first to third springs SP1 to SP3 are varied.

The solid line in FIG. 4 indicates the vibration level of the damper device 10 of the above embodiment. In addition, the alternate long and short dash line in FIG. 4 indicates the vibration level of a damper device of a first alternative embodiment in which, in the damper device 10 of the embodiment, the spring constant k3 of each third spring SP3 is set so as to be smaller than the spring constant k1 of each first spring SP1 and is set so as to be larger than the spring constant k2 of each second spring SP2 (k1>k3>k2 (k1>>k3>k2)). Furthermore, the alternate long and two short dashes line in FIG. 4 indicates the vibration level of a damper device of a second alternative embodiment in which, in the damper device 10 of the embodiment, all the first to third springs SP1 to SP3 are coils springs and the spring constants of the first to third springs SP1 to SP3 are set such that k1>k2>k3 (k1>>k2>k3) as in the case of the damper device 10. Then, the broken line in FIG. 4 indicates the vibration level of a damper device of a comparative embodiment in which, in the damper device 10 of the embodiment, all the first to third springs SP1 to SP3 are coil springs and the spring constants of the first to third springs SP1 to SP3 are the same (k1=k2=k3).

As is apparent from FIG. 4, in the damper device 10 of the embodiment and the damper device of the first alternative embodiment, as compared with the damper device of the comparative embodiment, the resonance frequency of the first and second intermediate members 12 and 14 increases, so resonance between the first intermediate member 12 and the second intermediate member 14 occurs at the time when the rotation speed of the engine is relatively high. Then, as is apparent from comparison with the comparative embodiment, in the damper device 10 of the embodiment and the damper device of the first alternative embodiment, arc springs used as the third springs SP3 in order to provide long stroke (low stiffness) are arranged radially inward of the first and second springs SP1 and SP2 so as to reduce hysteresis, so it is possible to further appropriately damp resonance between the first intermediate member 12 and the second intermediate member 14, which occurs at the time when the rotation speed of the engine is further increased.

In addition, in the damper device 10 of the embodiment and the damper device of the first alternative embodiment, as compared with the damper device of the comparative embodiment, the resonance of the damper device as a whole occurs at the time when the rotation speed of the engine is lower before completion of lockup because of a decrease in the resonance frequency of the damper device as a whole. Thus, the vibration level at the time when the rotation speed of the engine is near the lock-up rotation speed Nlup further decreases. Thus, in the damper device 10 of the embodiment and the damper device of the first alternative embodiment, it is possible to exceedingly smoothly carry out lockup by the lock-up clutch mechanism 8 at the time when the rotation speed of the engine has reached the extremely low lock-up rotation speed Nlup.

Furthermore, when the damper device 10 of the embodiment is compared with the damper device of the first alternative embodiment, in the damper device of the first alternative embodiment, the spring constant k3 of each third spring SP3 is set so as to be larger than the spring constant k2 of each second spring SP2, so the sum of the spring constant k1 of each first spring SP1 and the spring constant k3 of each third spring SP3 is further increased to thereby make it possible to further increase the resonance frequency fi of the first and second intermediate members 12 and 14 and to further decrease the resonance frequency ft of the damper device 10 as a whole. Thus, in the damper device of the first alternative embodiment, as shown in FIG. 4, as compared with the damper device 10 of the embodiment, resonance between the first intermediate member 12 and the second intermediate member 14 may be caused to occur at the time when the rotation speed of the engine is relatively high, and the resonance of the damper device as a whole may be caused to occur at the time when the rotation speed of the engine before completion of lockup is relatively low.

As described above, the damper device 10 included in the fluid transmission apparatus 1 of the embodiment includes the drive member 11 to which power from the engine that serves as a motor is transmitted, the first intermediate member 12 to which power is transmitted from the drive member 11 via the first springs SP1, the second intermediate member 14 to which power is transmitted from the first intermediate member 12 via the second springs SP2, and the driven member 15 to which power is transmitted from the second intermediate member 14 via the third springs SP3. Then, in the damper device 10 of the embodiment, coil springs are used as the first and second springs SP1 and SP2, and arc springs that are arranged radially inward of the first and second springs SP1 and SP2 are used as the third springs SP3. In this way, the third springs SP3, which are one of the plurality of serially arranged springs, are arc springs, so it is possible to provide long stroke (low stiffness) for the damper device 10. In addition, the third springs SP3 that are arc springs are arranged radially inward of the first and second springs SP1 and SP2 to reduce centrifugal force that acts on the third springs SP3 to thereby reduce the hysteresis of the third springs SP3, that is, friction force that acts on the third springs SP3 during a reduced load. By so doing, it is possible to appropriately maintain the vibration damping characteristic of the third springs SP3. Thus, in the damper device 10 of the embodiment, it is possible to improve the vibration damping characteristic while providing long stroke using arc springs.

Furthermore, in the damper device 10 of the embodiment, the stiffness of each first spring SP1 is set so as to be higher than the stiffness of each second spring SP2 and the stiffness of each third spring SP3. That is, when the stiffness of each first spring SP1 is set so as to be higher than the stiffness of each second spring SP2, this makes it easy to substantially integrate the first intermediate member 12 with the second intermediate member 14, and the resonance frequency fi of the first and second intermediate members 12 and 14 is increased by setting the stiffness of each first spring SP1 so as to be relatively high, so it is possible to cause resonance between the first intermediate member 12 and the second intermediate member 14 when the rotation speed of the drive member 11 is relatively high, that is, when the rotation speed of the engine is relatively high, and torque (vibrating force) from the engine is relatively low. By so doing, it is possible to suppress an increase in the vibration level of the damper device 10 as a whole due to resonance between the first intermediate member 12 and the second intermediate member 14. Then, when the stiffness of each first spring SP1 is set so as to be higher than the stiffness of each third spring SP3, the characteristic of the arc springs that are the third springs SP3 is utilized to improve the vibration damping characteristic while providing the long stroke (low stiffness) for the damper device 10, and it is possible to appropriately damp resonance between the first intermediate member 12 and the second intermediate member 14 by the third springs SP3.

In addition, the drive member 11 that constitutes the damper device 10 of the embodiment is connected via the lock-up clutch mechanism 8 to the front cover 3, which serves as the input member coupled to the engine, and the driven member 15 is coupled to the input shaft of the transmission. That is, the above described damper device 10 uses arc springs to provide the long stroke (low stiffness) and improve the vibration damping characteristic, and the damper device 10 is able to cause resonance between the first intermediate member 12 and the second intermediate member 14 or decrease the resonance frequency of the damper device 10 as a whole when the rotation speed of the drive member 11 is relatively high, that is, when the rotation speed of the engine is relatively high, and torque (vibrating force) from the engine is relatively low. Thus, by using the above damper device 10, when the rotation speed of the engine is extremely low, it is possible to carry out lockup by the lock-up clutch mechanism 8, that is, couple the front cover 3 to the input shaft of the transmission, while appropriately reducing transmission of vibrations from the front cover 3 to the input shaft of the transmission.

Note that the above described fluid transmission apparatus 1 is configured as the torque converter that includes the pump impeller 4, the turbine runner 5 and the stator 6; instead, the fluid transmission apparatus that includes the damper device according to the present invention may be configured as a fluid coupling that has no stator. In addition, the above described fluid transmission apparatus 1 may include a friction-type multiple disc lock-up clutch mechanism instead of the friction-type single disc lock-up clutch mechanism 8.

Here, the correspondence relationship between major elements of the above described embodiment, and the like, and major elements of the invention described in the summary of the invention will be explained. That is, in the above described embodiment, and the like, the drive member 11 to which power from the engine, which serves as a motor, is transmitted corresponds to the "input element", the first springs SP1, which are coils springs, to which power is transmitted from the drive member 11 correspond to the "first elastic body", the first intermediate member 12 to which power is transmitted from the first springs SP1 corresponds to the "first intermediate element", the second springs SP2, which are coil springs, to which power is transmitted from the first intermediate member 12 correspond to the "second elastic body", the second intermediate member 14 to which power is transmitted from the second springs SP2 corresponds to the "second intermediate element", the third springs SP3, which are arc springs, to which power is transmitted from the second intermediate member 14 correspond to the "third elastic body", and the driven member 15 to which power is transmitted from the third springs SP3 corresponds to the output element.

However, the correspondence relationship between the major elements of the embodiment and the major elements of the invention described in the summary of the invention is one example for specifically explaining a mode in which the embodiment carries out the invention described in the summary of the invention, so the correspondence relationship does not intend to limit the elements of the invention described in the summary of the invention. That is, the embodiment is just one specific example of the invention described in the summary of the invention, and the interpretation of the invention described in the summary of the invention should be made on the basis of the description itself.

The mode for carrying out the present invention is described above with reference to the embodiment; however, the present invention is not limited to the above embodiment, and, of course, may be modified into various forms without departing from the scope of the invention.

The present invention is usable in the manufacturing industry, or the like, of a damper device.

What is claimed is:

1. A damper device comprising:
   an input element configured to transmit power from a motor to a first elastic body;
   the first elastic body configured to transmit power from the input element to a first intermediate element;
   the first intermediate element configured to transmit power from the first elastic body to a second elastic body;
   the second elastic body configured to transmit power from the first intermediate element to a second intermediate element;
   the second intermediate element configured to transmit power from the second elastic body to a third elastic body;
   the third elastic body configured to transmit power from the second intermediate element to an output element; and
   the output element to which power is transmitted from the third elastic body, wherein
   the first and second elastic bodies are straight coil springs, and the third elastic body is an arc spring that is arranged radially inward of the first and second elastic bodies, and
   the first intermediate element is formed as an annular member, an entire inner surface of the annular member supporting an outer surface of the first elastic body and an outer surface of the second elastic body, the inner surface of the annular member being formed as an annular shape.

2. The damper device according to claim 1, wherein
   the input element has a contact portion that contacts with one end of the first elastic body,
   the first intermediate element has a contact portion that is arranged between the other end of the first elastic body and one end of the second elastic body adjacent to the first elastic body and that contacts with both,
   the second intermediate element has a contact portion that contacts with the other end of the second elastic body and a contact portion that contacts with one end of the third elastic body, and
   the output element has a contact portion that contacts with the other end of the third elastic body.

3. The damper device according to claim 2, wherein
   a stiffness of the first elastic body is higher than stiffnesses of the second and third elastic bodies.

4. The damper device according to claim 3, wherein
   the input element is connected via a lock-up clutch to an input member coupled to the motor, and the output element is coupled to an input shaft of a transmission.

5. The damper device according to claim 1, wherein
   a stiffness of the first elastic body is higher than stiffnesses of the second and third elastic bodies.

6. The damper device according to claim 1, wherein
   the input element is connected via a lock-up clutch to an input member coupled to the motor, and the output element is coupled to an input shaft of a transmission.

7. The damper device according to claim 1, wherein the arc spring is configured to extend about 45 degrees or more of an inner circumference of the damper device.

8. The damper device according to claim 1, wherein the arc spring is configured to extend about 90 degrees or more of an inner circumference of the damper device.

9. A damper device comprising:
   an input element configured to transmit power from a motor to a first elastic body;
   the first elastic body configured to transmit power from the input element to a first intermediate element;
   the first intermediate element configured to transmit power from the first elastic body to a second elastic body;
   the second elastic body configured to transmit power from the first intermediate element to a second intermediate element;
   the second intermediate element configured to transmit power from the second elastic body to a third elastic body;
   the third elastic body configured to transmit power from the second intermediate element to an output element; and
   the output element to which power is transmitted from the third elastic body, wherein
   the first and second elastic bodies are straight coil springs, and the third elastic body is an arc spring that is arranged radially inward of the first and second elastic bodies, and
   the first intermediate element covers the first elastic body and the second elastic body,
   the first intermediate element has a first cover member and a second cover member, the first cover member covering a first side part of the first and the second elastic bodies, and the second cover member covering a second side part of the first and the second elastic bodies, the first side part being substantially opposite from the second side part with respect to the first and the second elastic bodies in an axial direction of the damper device.

10. The damper device according to claim 9, wherein
    the input element has a contact portion that contacts with one end of the first elastic body,
    the first intermediate element has a contact portion that is arranged between the other end of the first elastic body and one end of the second elastic body adjacent to the first elastic body and that contacts with both, the second intermediate element has a contact portion that contacts with the other end of the second elastic body and a contact portion that contacts with one end of the third elastic body, and the output element has a contact portion that contacts with the other end of the third elastic body.

11. The damper device according to claim 10, wherein a stiffness of the first elastic body is higher than stiffnesses of the second and third elastic bodies.

12. The damper device according to claim 11, wherein the input element is connected via a lock-up clutch to an input member coupled to the motor, and the output element is coupled to an input shaft of a transmission.

13. The damper device according to claim 9, wherein a stiffness of the first elastic body is higher than stiffnesses of the second and third elastic bodies.

14. The damper device according to claim 9, wherein the input element is connected via a lock-up clutch to an input member coupled to the motor, and the output element is coupled to an input shaft of a transmission.

15. The damper device according to claim 9, wherein the arc spring is configured to extend about 45 degrees or more of an inner circumference of the damper device.

16. The damper device according to claim 9, wherein the arc spring is configured to extend about 90 degrees or more of an inner circumference of the damper device.

17. A damper device comprising:
an input element configured to transmit power from a motor to a first elastic body;
the first elastic body configured to transmit power from the input element to a first intermediate element;
the first intermediate element configured to transmit power from the first elastic body to a second elastic body;
the second elastic body configured to transmit power from the first intermediate element to a second intermediate element;
the second intermediate element configured to transmit power from the second elastic body to a third elastic body;
the third elastic body configured to transmit power from the second intermediate element to an output element; and
the output element to which power is transmitted from the third elastic body, wherein
the first and second elastic bodies are straight coil springs, and the third elastic body is an arc spring that is arranged radially inward of the first and second elastic bodies, and
the first intermediate element covers the first elastic body and the second elastic body,
the first intermediate element has a first cover member and a second cover member, the first cover member extending substantially in parallel with an axial direction of the damper device and covering a first side part of the first and the second elastic bodies, and the second cover member extending substantially perpendicular to the axial direction of the damper device and covering a second side part of the first and the second elastic bodies.

18. The damper device according to claim 17, wherein an end portion of the first cover member bends along a circumference direction of the first and the second elastic bodies, and an end of the first cover member is located substantially opposite side of an end of the second cover member with respect to the first and the second elastic bodies.

* * * * *